Dec. 31, 1963     L. J. GEE     3,116,168
THERMOCOUPLE PROBE
Filed April 18, 1961
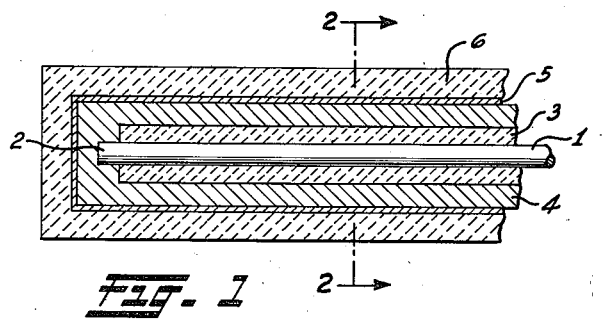
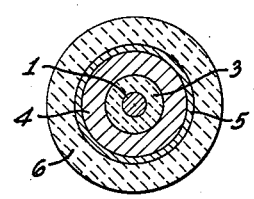
INVENTOR:
LEROY J. GEE
BY
ATTORNEYS United States Patent Office 3,116,168
Patented Dec. 31, 1963

3,116,168
THERMOCOUPLE PROBE
Leroy J. Gee, Palo Alto, Calif., assignor to American Radiator & Standard Sanitary Corporation, New York, N.Y., a corporation of Delaware
Filed Apr. 18, 1961, Ser. No. 103,844
4 Claims. (Cl. 136—4)

This invention relates to and in general has for its object the provision of a compact thermocouple probe capable of operating in a temperature range of from 3500° F. to 4200° F. in an oxidizing atmosphere, and which can be designed for a life of from 100 to 1000 hours, capable of withstanding a temperature change of 1000° F. per second and of responding in 2 to 3 seconds in quiescent air, having a signal output in the order of 20 mv at 3500° F., having an accuracy of ±1% for the first 100 hours of operation and an accuracy in the order of ±2% during the following 1000 hours of operation.

The need for adequate means of measuring high temperatures in an oxidizing atmosphere has existed for some time. For some applications, such special methods as pyrometric devices and pneumatic probes have been utilized. However, temperature sensors having the necessary characteristics (i.e., accuracy, stability, long life, repeatability, and ease of application), although commonly available for the lower and middle-temperature regions, are presently not available for the high-temperature regions. Considerable effort has been devoted to this particular problem especially in the area of thermoelectric methods. At least seven thermocouple combinations presently having calibrations up to 4000° F. are described in the literature. Unfortunately, however, none of these can be used in oxidizing environments. Thus, the combination of high temperatures and oxidizing atmospheres presents an obstacle that has not yet been satisfactorily overcome. Because of this lack of available thermoelectric materials that can be directly used in high-temperature oxidizing atmospheres, much effort has been expended in developing sheaths and coatings to protect thermocouple junctions from the effects of oxidation. These efforts have not been completely successful because of the difficulty of obtaining completely gas-tight and impermeable sheaths. Where these approaches are successful, the performance characteristics of the thermocouple are usually compromised because of the necessary addition of considerable mass and size to the temperature-sensitive areas.

Various known methods of temperature sensing are: expansion, pressure, and resistance thermometers; thermocouples; pyrometers. Expansion- and pressure-type thermometers are generally applicable to the lower temperature regions where the physical chaacteristics of th sensor material, such as linear expansion, volumetric expansion, or vapor pressures, are accurately known. At extremely high temperatures, the uncertainty of these physical properties and the difficulty of finding suitable materials to serve either as the sensor or to contain the sensor usually elminate these particular methods for consideration. At the other extreme, pyrometric devices are particularly applicable to high-temperature measurements but require that the source emissivity be known or that black-body conditions exist before accurate measurements can be obtained. In the present application, the geometrical limitation precludes pyrometric means. It appears then that the solution lies in either some unique thermoelectric approach or the resistance-thermometer concept. In the past decade, a major portion of the research work in the field of high-temperature sensing has been devoted to the development of suitable thermocouples, now extensively utilized.

More specifically, the object of this invention is the provision of a thermocouple probe including inner and outer coaxial thermocouple elements, bonded to each other at their ends and otherwise insulated from each other by an intervening metal oxide layer or film; a layer of getter material bonded to and surrounding the outer thermocouple element and a metal oxide coating surrounding and bonded to the layer of getter material.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 1 is a fragmentary mid-section taken through a thermocouple probe embodying the objects of my invention.

FIG. 2 is a transverse section taken on the section line 2—2 of FIG. 1.

The probe as illustrated in these figures includes an inner thermocouple element 1 made of iridium. Flame-sprayed on the element 1, except at the extreme left end 2 thereof, is an insulating layer or coating 3 of a metal oxide, preferably beryllium oxide or thorium oxide. Sintered over the coating 3 and over the exposed end 2 of the element 1 is a layer or coating 4 of self-bonded silicon carbide (SiC) serving as an outer or second thermocouple element. Flame-sprayed over the element or coating 4 is a layer, film or coating 5 of a getter material such as tantalum or rhenium. Finally, sprayed over the getter coating 5 is an outer insulating coating 6 preferably made of a metal oxide such as beryllium oxide or thorium oxide.

Obviously the materials from which the two thermocouple elements 1 and 4 are made can be interchanged—that is, the element 1, instead of being made of iridium, can be made of silicon carbide, in which case the outer element 4 would be made of iridium. However, the inner element 1 is preferably made of iridium, for then the iridium is protected against oxidation by the other material.

In either event, the resulting structure forms a compact probe operative within a range of temperatures of from 3500° to 4200° F. and otherwise capable of meeting the requirements above set forth.

Although dimensions are here not critical, the inner iridium element 1 can be of a diameter in the order of 0.010 to 0.015 inch and the insulating layer 3 can be in the order of 0.005 inch thick. The iridium is of itself reasonably oxidation-resistant, and what oxidation might otherwise occur is inhibited by the surrounding layer 4 of getter material. This is necessary, for the metal oxide coatings do not form gas-tight barriers insuring indefinite life.

I claim:

1. A thermocouple probe comprising: first and second outer and inner coaxial thermocouple elements bonded together at one end thereof and otherwise insulated from each other by an intervening metal oxide coating bonded to both elements; a coating of getter material surrounding and bonded to the outer element, and a metal oxide coating surrounding and bonded to said coating of getter material, one of said elements being made of silicon carbide and the other of said elements being made of iridium.

2. A thermocouple probe of the character set forth in claim 1 wherein said getter material is selected from the group consisting of tantalum and rhenium.

3. A thermocouple probe of the character set forth in claim 1 wherein said metal oxide is selected from the group consisting of beryllium oxide and thorium oxide.

4. A thermocouple probe of the character set forth in claim 3 wherein said getter material is selected from the group consisting of tantalum and rhenium.

References Cited in the file of this patent

UNITED STATES PATENTS

| | | |
|---|---|---|
| 2,802,894 | Schneider et al. | Aug. 13, 1957 |
| 2,870,233 | Comer | Jan. 20, 1959 |
| 2,915,575 | Thomas | Dec. 1, 1959 |
| 2,948,766 | Schneider et al. | Aug. 9, 1960 |

FOREIGN PATENTS

| | | |
|---|---|---|
| 191,712 | Great Britain | July 5, 1923 |